Figure 2:
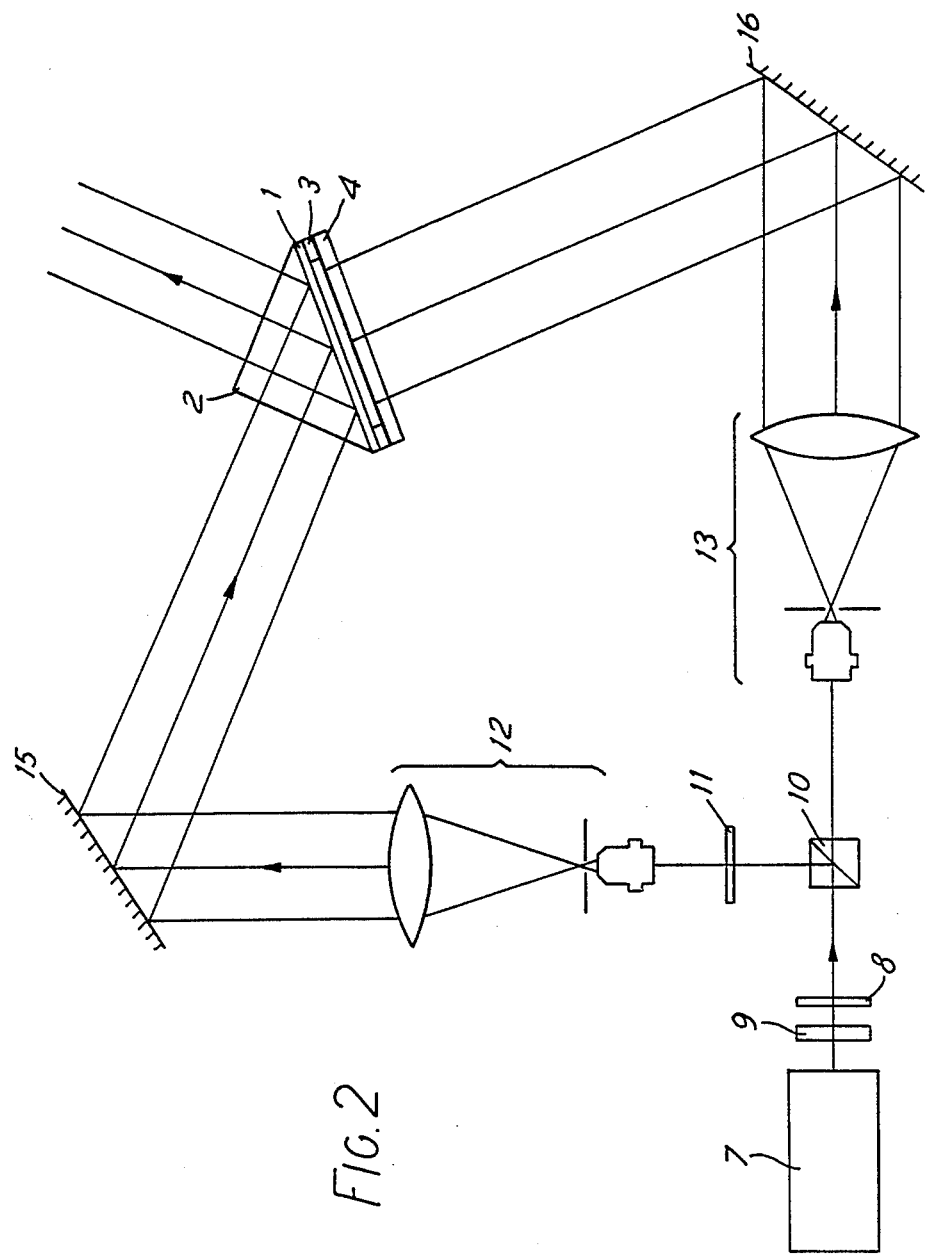

United States Patent [19]

Lang et al.

[11] Patent Number: 4,943,126
[45] Date of Patent: Jul. 24, 1990

[54] REPLICATION OF CARRIERS BEARING DIGITALLY RECORDED INFORMATION

[75] Inventors: Anthony Lang, Surrey, England; Paul Bloch, deceased, late of Oxfordshire, England, by Linda R. Bloch, legal representative

[73] Assignee: Thorn EMI plc, London, United Kingdom

[21] Appl. No.: 408,947

[22] Filed: Sep. 18, 1989

Related U.S. Application Data

[63] Continuation of Ser. No. 129,553, Dec. 7, 1987, abandoned.

[30] Foreign Application Priority Data

Dec. 6, 1986 [GB] United Kingdom ............... 8629223

[51] Int. Cl.$^5$ .................. G03H 1/22; G03H 1/20; G11C 13/04
[52] U.S. Cl. .................. 350/3.69; 365/125; 350/3.6
[58] Field of Search .................. 350/3.6, 3.69, 320; 365/115, 116, 234, 125; 369/292

[56] References Cited

FOREIGN PATENT DOCUMENTS 2368780  5/1978  France .
59-3463  1/1984  Japan .
WO87/00334  1/1987  PCT Int'l Appl. .

Primary Examiner—Bruce Y. Arnold
Assistant Examiner—David R. Parsons
Attorney, Agent, or Firm—Fleit, Jacobson, Cohn, Price, Holman & Stern

[57] ABSTRACT

The holographic manufacture of Compact Discs has three stages namely mastering, production of the submaster holograms and replication. In the production stage, a holographic plate, spacer and master transparency are positioned against a prism, and then illuminated with split beams from a laser in order to record a hologram, at the plate, of the master transparency. The resultant hologram of the plate is then mass replicated on polycarbonate or photochromic discs to produce compact Discs compatible to conventional Compact Disc players.

8 Claims, 8 Drawing Sheets

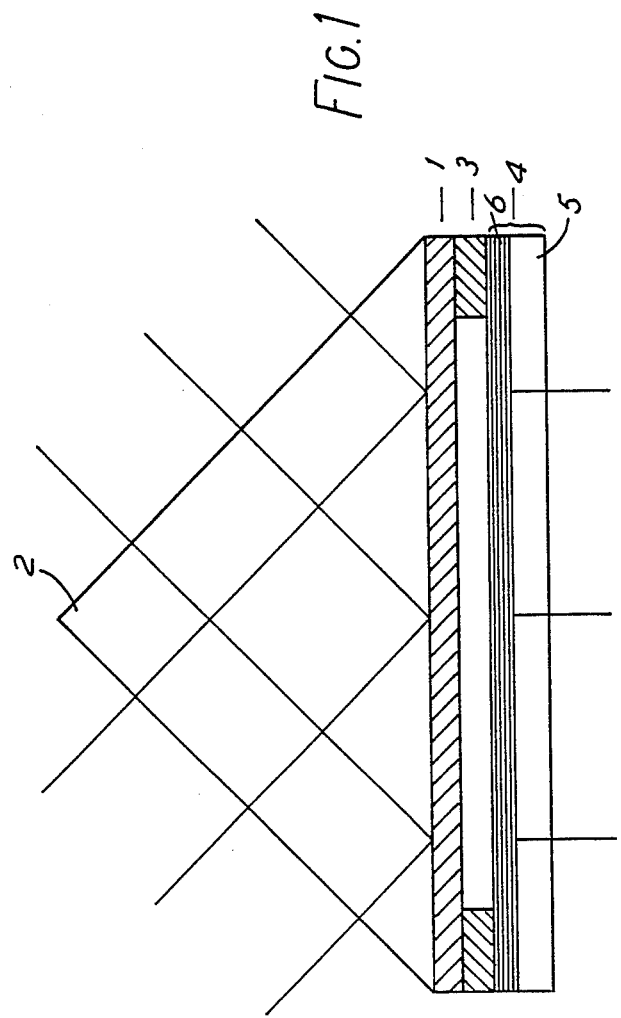
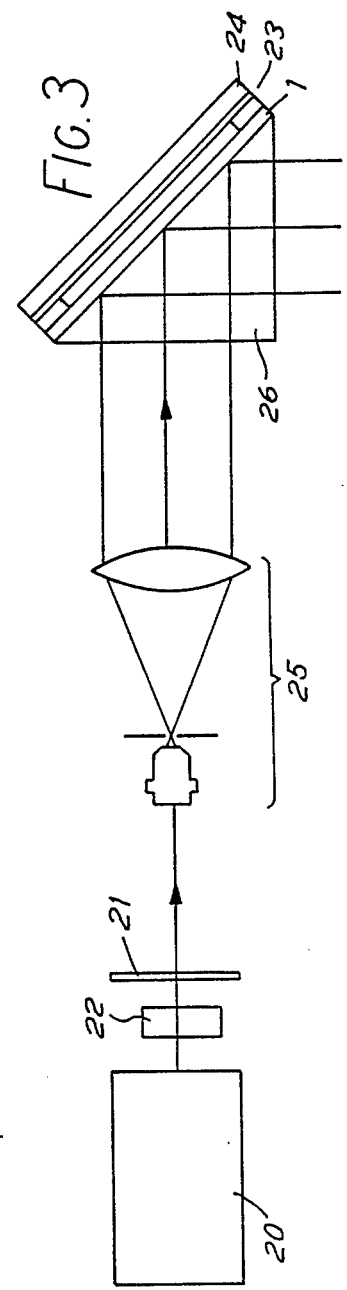

EXPOSE WITH ULTRA-VIOLET LIGHT

READ WITH INFRA-RED LIGHT

REPLICATION OF CARRIERS BEARING DIGITALLY RECORDED INFORMATION

This application is a continuation of application Ser. No. 07/129,553, filed Dec. 7, 1987 (now abandoned). This invention relates to the replication of carriers bearing digitally recorded information, for example Compact Discs, using optical phase conjugation.

PCT Patent Specification No. WO 87/00334 disclosed the creation of a hologram which represents a Compact Disc and thereafter effecting replaying from the recreated real image. Thus the hologram represents a 3-D image of an actual Compact Disc and the reading laser interrogates the real image, i.e. looks for λ/4 deep pit in the image.

An object of this invention is to provide for potentially cheaper replication than is achievable by conventional pressing and may even be used for in-store replication. Another object of this invention is to provide replication which is compatible with existing Compact Disc Players.

The present invention provides equipment for the replication of carriers bearing digitally recorded information comprising means to locate a transparency of a carrier at a replication station, the carrier bearing digitally recorded information, means to position a photosensitive plate at the replication station, means to illuminate the carrier and the plate at the replication station to effect holographic patterning on the carrier, means to produce one or more replication carriers each having representations of the digitally recorded information derived from the holographic patterning on said photosensitive carrier.

Preferably, a carrier comprises a disc. Alternatively, it may comprise a card.

The present invention also provides a method for the replication of carriers bearing digitally recorded information comprising locating a transparency of a carrier at a replication station, the carrier bearing digitally recorded information, positioning a photosensitive plate at the replication station, illuminating the carrier and the plate at the replication station to affect holographic patterning on the carrier, producing one or more replication carriers each having representations of the digitally recorded information derived from the holographic patterning on said photosensitive carrier.

The present invention also embodies a replicated carrier produced by the equipment and/or the method hereinabove defined.

Figure 4:
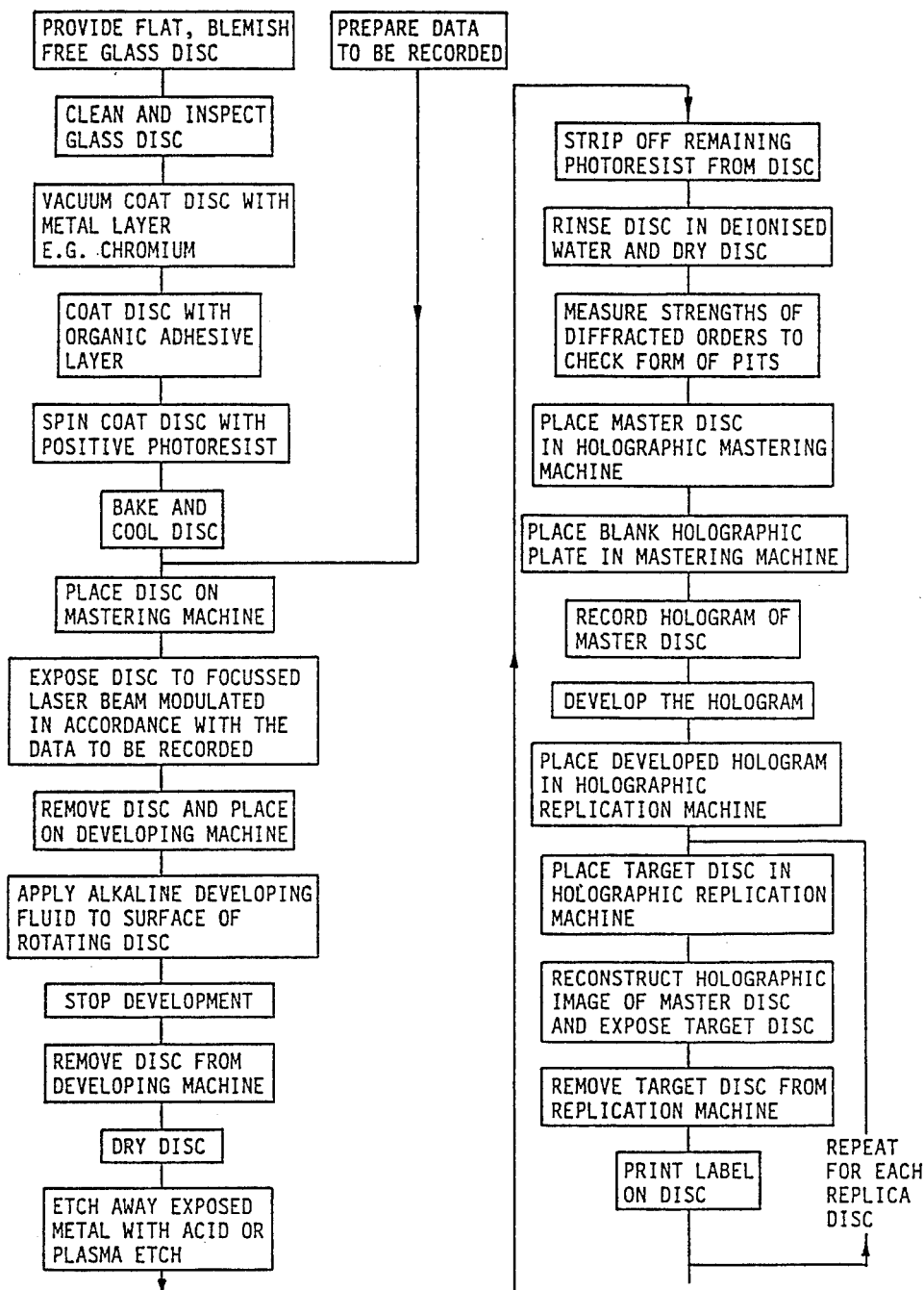
Figure 5:
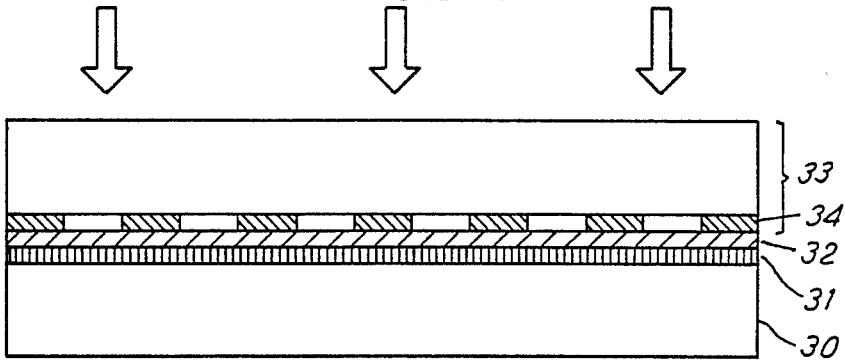
Figure 6:
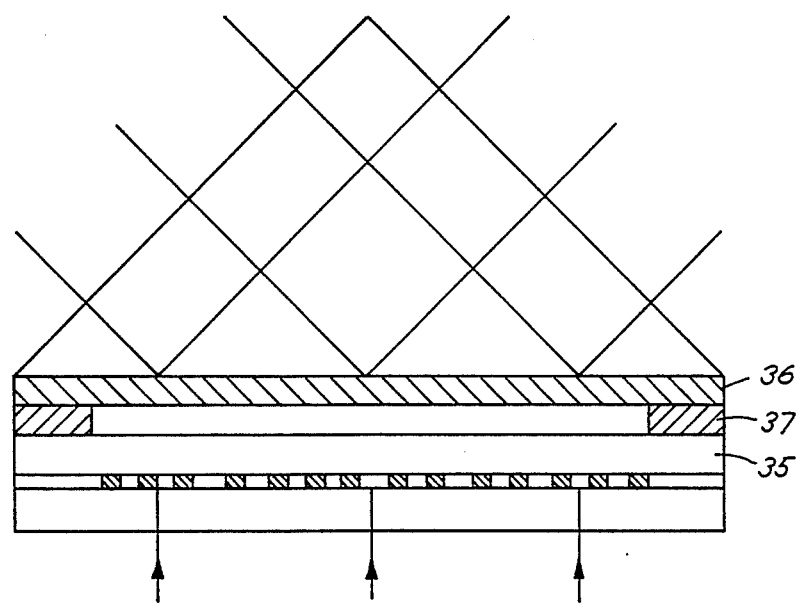
Figure 7:
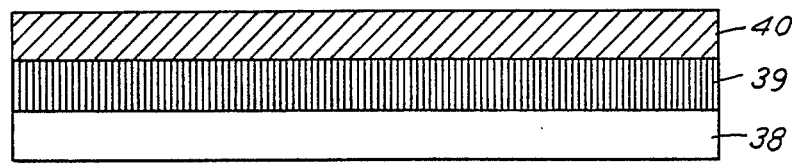
Figure 8:
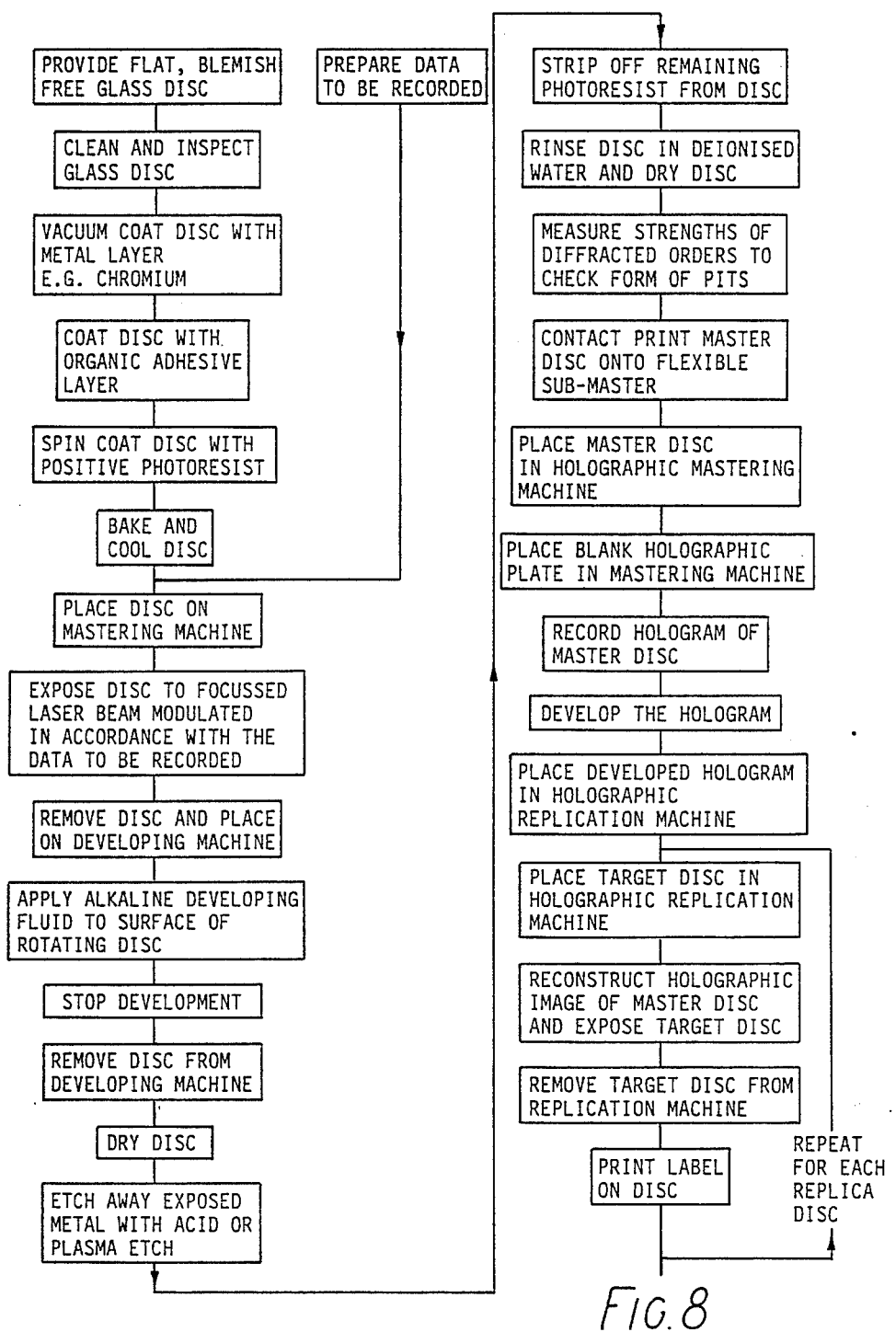
Figure 9:
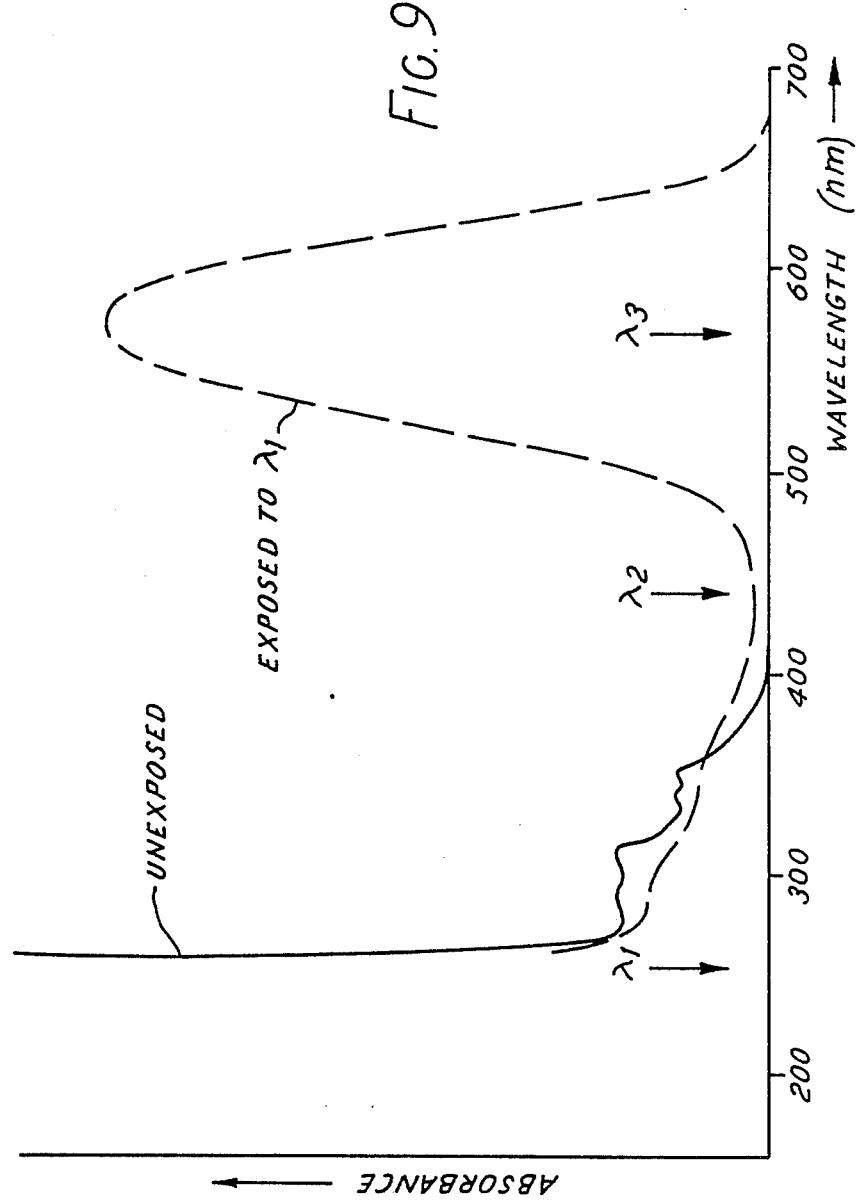
Figure 10:
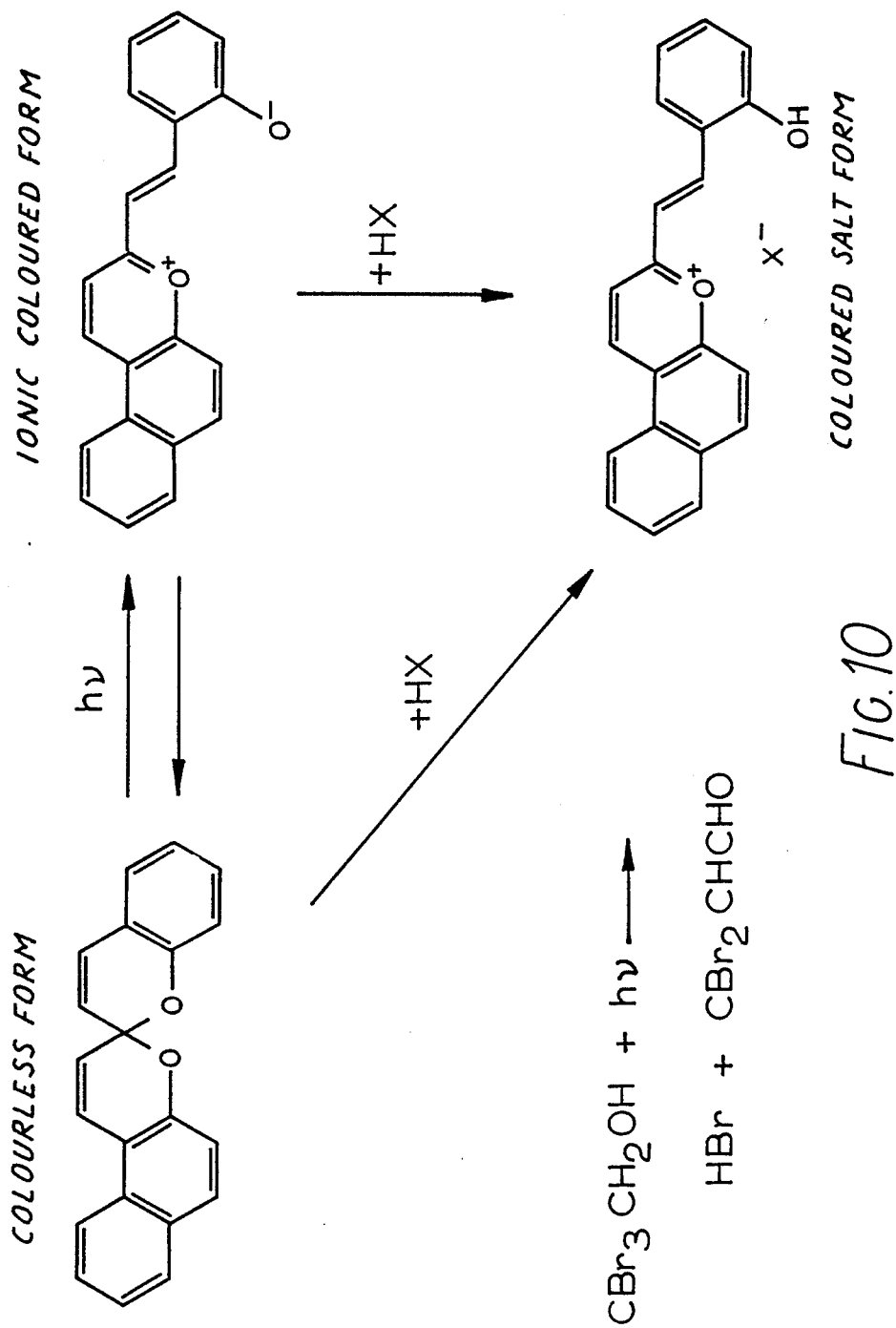
Figure 11A:
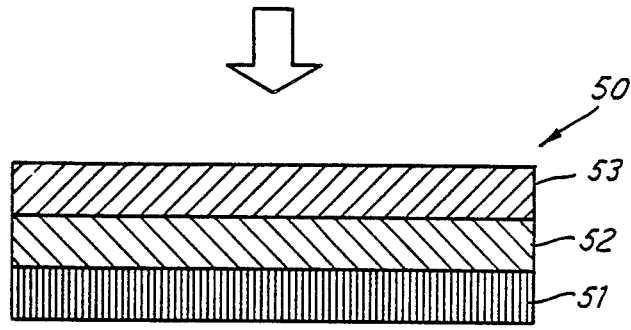
Figure 11B:
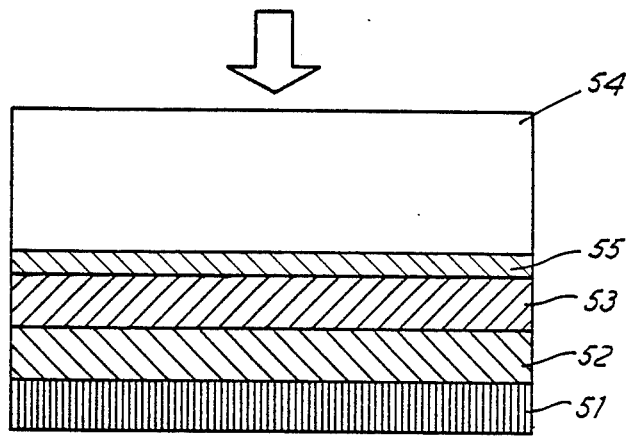

In order that the invention may more readily be understood, a description is now given, by way of example only, reference being made to the accompanying drawings in which: FIGS. 1 to 4 relate to a system of replication embodying the present invention;

FIG. 5 relates to a modification to the system of FIGS. 1 to 4;

FIGS. 6 to 8 relate to another modification to the system of FIGS. 1 to 4;

FIGS. 9 to 11 relate to material for use in the system of FIGS. 1 to 4.

The manufacture of Compact Discs by the holographic method of the present invention has three stages, namely mastering, production of the sub-master holograms and replication.

In the mastering stage, the master disc for holographic replication is produced by a modification of the standard compact Disc mastering technique. Before the master disc can be recorded, the substrate and the information to be recorded are prepared. The master disc substrate is a polished glass disc approximately twice the diameter of a Compact Disc. This is cleaned, inspected and coated with a thin layer of reflective metal such as chromium. The disc is then coated with an organic adhesive layer, followed by a thin layer of positive photoresist approximately 0.1 micrometers thick. The disc is then baked to increase the stability of the photoresist.

The data to be recorded (for example music, computer data bases, computer programs etc is digitized (if necessary) and encoded into the standard format [see, for example, "Principles of Optical Disc Systems" by G. Bouvhuis et al, ISBN 0-85274-785-3) including the addition of subcode information and error correction information. The disc is then ready to be recorded.

To record the master disc, the blank substrate is placed on a standard mastering machine. The blank disc is spun at the same speed at the final Compact Disc (read/write velocity —1.25 meters per second). Light from a deep blue laser (usually of wavelength 457.9 nanometers from an argon ion laser or 442 nanometers from a helium cadmium laser) is passed through a high speed optical modulator (usually an electro-optical or acusto-optical modulator) which modulates the intensity of the light beam in accordance with the data to be recorded. The light beam is then expanded using either a negative lens or a telescope, so that it fills the aperture of a high numerical aperture objective lens. This lens focuses the light onto the photoresist layer. Some of the light is reflected by the disc and passes back through the objective lens, and is passed via a beamsplitter to a video camera which monitors the focus condition of the system.

The depth of focus of the lens is approximately +/−0.5 micrometers, and therefore a dynamic focusing system is required. Light from a red or infra-red laser [for example a helium neon or diode laser) is coupled into the optical system using a dichroic mirror. The photoresist is of low sensitivity to red and infra-red light.

This light is reflected by the disc and is used to provide a focus error signal using, for example, the double-wedge Foucault method. The error signal is used to control the current flowing through a coil wound around the objective lens, which is mounted inside a magnet. This moves the objective lens up and down to keep the light focused on the disc. The linear translation of the objective and the rotation of the master disc must also be controlled. The linear translation is measured with an inductive speed transducer and the rotational velocity is measured with a tachometer, both being controlled by closed loop servo systems. The effect of the light on the exposed regions of the photoresist is to locally change its solubility.

To develop the disc, it is removed from the mastering machine and placed on a developing machine. The disc is spun and an alkaline solution is made to flow over the surface of the photoresist. This dissolves the photoresist in the exposed regions which exposes the metal layer in these regions. Development times are typically 20 to 30 seconds. Slight variations in the photoresist properties and recording conditions may be compensated for by adjustments in the development time. The pit structure is monitored during development by illuminating a specially recorded test band on the disc with light from a helium neon laser. The intensities of the first diffracted order are a measure of the amount of material dissolved away, and can therefore be used to stop the development process at the optimum time.

After the disc has been developed the exposed metal regions are removed with an acid or plasma etch. The remaining photoresist is then chemically removed and the disc is washed and dried. The resulting master disc is a transparency with transmitting regions in an opaque metal layer. These apertures correspond to the pits on a conventional master disc. After the disc has been developed, the intensities of the first and second diffracted transmission orders may be measured over the recorded area to provide information about the uniformity and quality of the pits.

The next stage of the manufacturing process concerns the production of the holographic sub-masters. A holographic plate 1 is optically contacted to the hypotenuse face of a 45 degree prism 2, with refractive index matching fluid between them to ensure good contact. The two short faces of the prism need to be anti-reflection coated to avoid stray reflected light. A thin spacer 3 is placed against the holographic plate 1 and the master transparency 4 (with glass substrate 5 and information-carrying layer 6) is placed against the other side of the spacer 3. The combination of prism, holographic plate, spacer and transparency are clamped around the edge of the sandwich to hold them in the same relative positions (see FIG. 1). These are then placed in the optical system shown schematically in FIG. 2.

Linearly polarized light from a deep blue laser 7 (for example an argon ion or helium cadmium laser) is passed through a half-wave plate 8 in a rotating mount to rotate the orientation of the polarization direction to any desired direction. A shutter 9 controls the exposure time (for example a leaf shutter of the type used in photographic cameras). The light then passes through a polarizing beamsplitter 10 (for example a thin film polarizing beamsplitter cube), which outputs two beams of light with orthogonal polarizations. By rotating the half-wave plate B, the relative amplitude of the two orthogonal polarization states in the light beam incident on the polarizing beamsplitter may be varied and thus the relative intensities of the two beams leaving the polarizing beamsplitter 10 may be varied.

In order for these two light beams to interfere with each other to record a hologram, they must have the same polarization state. As output from the polarizing beamsplitter 10 the two beams have orthogonal polarization states, so one of the beams must have the direction of its polarization axis rotated by 90 degrees. This may be achieved by placing suitably oriented half-wave plate 11 in one of the beams.

Each of the light beams is then expanded using beam expanders 12 and 13 so that they are of large enough diameters to fill the apertures of prism 2.

Suitable beam expanders may be produced using a telescope with two positive lenses, the first of these lenses being a microscope objective and the second a doublet lens. A pinhole aperture is placed at the focus of the first lens to remove the outer regions of the diffraction pattern by the first lens and thus improve the uniformity of the intensity distribution across the beam. The second lens is placed so that its focal point coincides with the pinhole, thus producing a collimated output beam.

The beam are deflected by plane mirrors 15 and 16 and directed into two of the faces of the prism 2. The light is diffracted by the apertures on the master transparency and spreads out in the air gap produced by the spacer 3 between the transparency 4 and the holographic plate 1.

The other beam is passed perpendicularly through one of the ehort faces of the prism 2. It passes into the holographic plate 1, is totally-internally-reflected at the air-holographic emulsion interface and leaves the prism 2 through the other short face.

Thus there are three light beam in the holographic emulsion:- the beam transmitted by the master transparency 4, the beam incident on the hypotenuse face of the prism 2 before reflection and the totally-internally-reflected beam. Each of these interferes with the other two to form a complex hologram of mixed Lippmann and transmission types. The holographic plate 1 is then separated from the prism 2, processed in the normal way and placed back in optical contact with the prism 2.

The optical path lengths in the two beams must be approximately equal so that the beams are coherent with one another when they are recombined so as to produce high contrast fringes.

The holographic mastering equipment must be mounted on an optical table fitted with a vibration damping system of the type commercially available. Also the system must be enclosed in a box to exclude air currents.

The next stage is to place the hologram 1 in a replication unit (see FIG. 3).

Linearly polarized light from a deep blue laser 20 (for example an argon ion or helium cadmium laser) is passed through a half-wave plate 21 to rotate its plane of polarization as before, because the hologram reconstructs two images of the master transparency with a phase differenced due to total internal reflection which is polarization dependent. A shutter 22 is also required as before.

A spacer 23 is then placed up against the hologram 1 and a photosensitive target disc 24 is placed against the spacer. Disc 24 has several layers, the substrate being out from sheet polycarbonate or injection moulded in a plain mould (i.e. flat on both sides), and coated with a photosensitive layer, a metal reflecting layer and a protective lacquer layer.

Hologram 1, spacer 23 and disc 24 then clamped together around the edge in similar fashion to before. With the laser beam expanded using a beam expander 25 of the type described previously, it is passed into a short face of a prism 26, which face corresponds to that from which the light emerged during the hologram recording state. This light is diffracted by the hologram into several beams. Two of these are replica of the light transmitted by the original master transparency, but travelling in the opposite direction to converge at point on the target disc corresponding to the pits on the final Compact Disc. The rest of the light is totally internally reflected at the emulsion-air interface and exits from the third face of the prism 26.

There will be a phase difference between the two reconstructed images of the disc due to the polarization sensitive phase change which occurs when the light is reflected at the hypotenuse face of the prism. As the polarization of the incident light is varied, the relative phase of the images changes. If the phase difference is zero, the amplitude add and the intensity of the image is maximized. If the phase difference is 180 degrees, the amplitude subtract, and the intensity of the image is minimized. The reconstructed image of the disc consists of a large number of intense spots, corresponding to the pits on the Compact Disc. The target disc is photo-sensitive, and undergoes some physical or chemical change when illuminated by light of the appropriate wavelength.

After exposure, the target disc is removed, and replaced with an unexposed disc. This cycle is repeated for each replica disc.

In use, the laser power is high enough to be a potential hazard to the sight of the operator. Therefore the replication unit is enclosed in a box, with safety devices fitted to shut off the laser beam if the box is opened while the laser is running.

The holographic manufacturing process is summarized in the flow diagram of FIG. 4.

The target discs may be made by injection moulding. An alternative, cheaper method which utilizes cheaper equipment is to produce sheets of the appropriate material by extrusion and then cut them into appropriate disc shapes.

One problem with the method described is that the resulting image on the target disc will be reversed relative to the original master disc. One solution is to reverse the direction of rotation of the original glass master disc during recording. Alternatively, a sub-master disc is contact-printed as shown in FIG. 5. Thus, a thin, flexible transparent disc 30 (for example a polymer disc) is coated with a thin layer of metal 31 (for example chromium) followed by a layer of positive photoresist 32. The original glass master disc 33 is placed face down on top of the resultant pile so that the photoresist layer 32 on the flexible disc is in contact with the metal layer 34 on the glass disc. The two discs 30, 33 are held in close contact with (for example) a slight difference in air pressure.

The flexible disc 30 is than flood exposed to ultra-violet light through the original glass master disc 33 and processed as before. This results in a flexible "mirror image" copy of the master disc.

The next stage is to record the holographic sub-master. The method described previously assumes that the master disc and target disc are perfectly flat. In practice they are not exactly flat, causing focussing problems.

To solve these problems the holographic recording equipment must have a reference surface against which the flexible master disc can be pushed, so that the information carrying layer lies in a well defined plane. This may be a flat glass plate 35, the optical quality of this plate not being critical (see FIG. 5).

The hologram plate 36 is exposed as before, processed and replaced in the same position relative to the spacer 37 and glass reference plate 35. From now on the hologram 36, spacer 37 and reference plate 35 are treated as one object. If the reference plate introduces any aberrations to the beam, these are cancelled out when the hologram is reconstructed. The hologram/spacer/reference plate sandwich is now placed in the replication unit.

The target discs have the form shown in FIG. 7, namely a thin flexible polymer disc 38 is coated with a layer of aluminum 39 followed by a layer of photosensitive (e.g. photoresist) material 40. A target disc is then pushed up against the reference surface in the replicating unit using, for example a slight difference in air pressure, so that the photosensitive layer is in contact with the reference surface. The hologram is now reconstructed to expose the target disc. After exposure, the target disc is laminated onto a transparent polymer substrate (for example polycarbonate) 1.2 mm thick to form the final disc. The replication process is summarized in FIG. 8.

In a variant to the above-described methods, photochromic discs are used in place of target discs with photoresist layers. Thus for example, a polymer-disc substrate is coated with a layer of reflective metal, for example aluminum, followed by a layer of fixable photochromic material, in a transparent binder. When the photochromic layer is exposed to ultra-violet or blue light it switches to a form which absorbs light of a longer wavelength. Thus a disc compatible with standard Compact Disc players can be obtained by exposing the photochromic layer to ultra-violet or blue light to darken small areas corresponding to the "pits" on a conventional disc.

Spiropyrams are a well known class of photochromic organic compounds. They are initially transparent to visible light, but become absorbent to red light if exposed to ultra-violet light.

FIG. 9 shows the spectral absorption of a typical spiropyran. If it is exposed to ultra-violet light of wavelength $\lambda_1$, an absorption band around $\lambda_3$ is generated and the initially transparent spiropyran becomes colored. Unfortunately this coloration is not stable and has a lifetime of usually less than a few weeks.

A stable coloration is achieved if the spiropyran reacts when an acid HX forming a colored suit (see FIG. 10). This acid RX may be generated within a layer containing a spiropyran by adding an acid donor compound. Maslowski (Applied Optica, Vol. 13, p. 857, 1974) found that some organic compounds containing a $CBr_3CH_2$ group are very suitable. If such a molecule absorbs ultra-violet light, hydrogen bromide (HBr) is generated and this immediately reacts with the spiropyran to form a stable salt. By a suitable choice of acid donor compound it is possible to select the wavelength required to generate the HBP. The material is totally insensitive to visible light and stable over many years provided it is protected from ultra-violet light.

A specific example of such a disc can be produced as follows. (see FIG. 11a which relate to exposure of the disc, and FIG. 11b which relates to reading it once laminated onto the substrate): the disc 50 is made as two discs laminated together, the bottom half of the disc being a thin and flexible polymer disc 51 (for example polycarbonate). This is coated with an aluminium reflective layer 52 followed by a layer of fixable photochromic material 53 (for example a spiropyran with an acid donor compound). For this application the spiropyran and acid donor compound need to be dissolved in a suitable transparent polymer. The disc 50 is exposed from the photochromic side to ultra-violet or blue light, either one spot at a time as in conventional write-once optical disc systems, or all in one exposure using, for example, holographic project.

The disc is then laminated onto an ultra-violet blocking substrate 54 of, for example, polycarbonate with adhesive 55. The polycarbonate may be tinted with an ultra-violet blocking dye, in order to prevent the disc being darkened by environmental ultra-violet light from, for example, the sun.

As Compact Disc players use a diode laser operating at a wavelength of 780 nanometers, the photochromic material is optimized to be transparent at this wavelength before writing, but to absorb strongly at this wavelength after writing.

It is claimed:

1. Equipment for the replication of carriers bearing digitally recorded information comprising:
   (a) master means for forming a transparency bearing a digital pattern representative of digitally recorded information;
   (b) sub-master means, including means for illuminating said transparency, so as to form hologram recorded with a holographic representation of said digital pattern, and
   (c) replication means for illuminating said hologram to form a digital representation of said digitally recorded information on one or more photo-sensitive carriers.

2. Equipment according to claim 1, wherein the carriers comprise discs.

3. Equipment according to claim 1 in which said sub-master means and said replication means each include a prism, said hologram being mounted on one surface of the prism such that the hologram is illuminated by light passing through the prism.

4. Equipment according to claim 1, in which said photo-sensitive carrier is a photochromic carrier.

5. Equipment according to claim 4 in which said photochromic carrier comprises a spiropyran.

6. A method for the replication of carriers bearing digitally recorded information comprising:
   (a) forming a transparency bearing a digital pattern representative of the digitally recorded information;
   (b) illuminating said transparency so as to form a hologram recorded with a holographic representation of said digital pattern; and
   (c) illuminating said hologram so as to form a digital representation of said digitally recorded information on one or more photo-sensitive carriers.

7. A method according to claim 6, wherein the carriers comprise discs.

8. A replicated carrier bearing digitally recorded information, the carrier being produced by the process of:
   (a) forming a transparency bearing a digital pattern representative of the digitally recorded information;
   (b) illuminating said transparency so as to form a hologram recorded with a holographic representation of said digital pattern; and
   (c) illuminating said hologram so as to form a digital representation of said digitally recorded information on one or more photo-sensitive carriers, each photo-sensitive carrier comprising a replicated carrier.

* * * * *